C. C. CARPENTER & R. J. ELLIS.
BATTERY CELL.
APPLICATION FILED APR. 6, 1916.

1,214,647.

Patented Feb. 6, 1917.

Witnesses
B. H. Caldwell
Ralph Munden

Inventors
Campbell C. Carpenter
Roy J. Ellis
By Raymond H. Van Vleet.
Attorney

UNITED STATES PATENT OFFICE.

CAMPBELL C. CARPENTER AND ROY J. ELLIS, OF NIAGARA FALLS, NEW YORK, ASSIGNORS TO U. S. LIGHT & HEAT CORPORATION, OF NIAGARA FALLS, NEW YORK, A CORPORATION OF NEW YORK.

BATTERY-CELL.

1,214,647.  Specification of Letters Patent.  Patented Feb. 6, 1917.

Application filed April 6, 1916. Serial No. 89,290.

*To all whom it may concern:*

Be it known that we, CAMPBELL C. CARPENTER and ROY J. ELLIS, citizens of the United States, residing at Niagara Falls, in the county of Niagara and State of New York, have invented new and useful Improvements in Battery-Cells, of which the following is a specification.

The present invention relates to battery cells.

An object of the present invention is to provide a battery cell consisting of jar and cover, the cover being so designed as to effectually cover and seal the jar.

A further object is to provide a construction in which the electrolyte is effectually prevented from creeping out of the cell by way of the cell posts.

Further objects will appear as the description proceeds.

Figure 1:
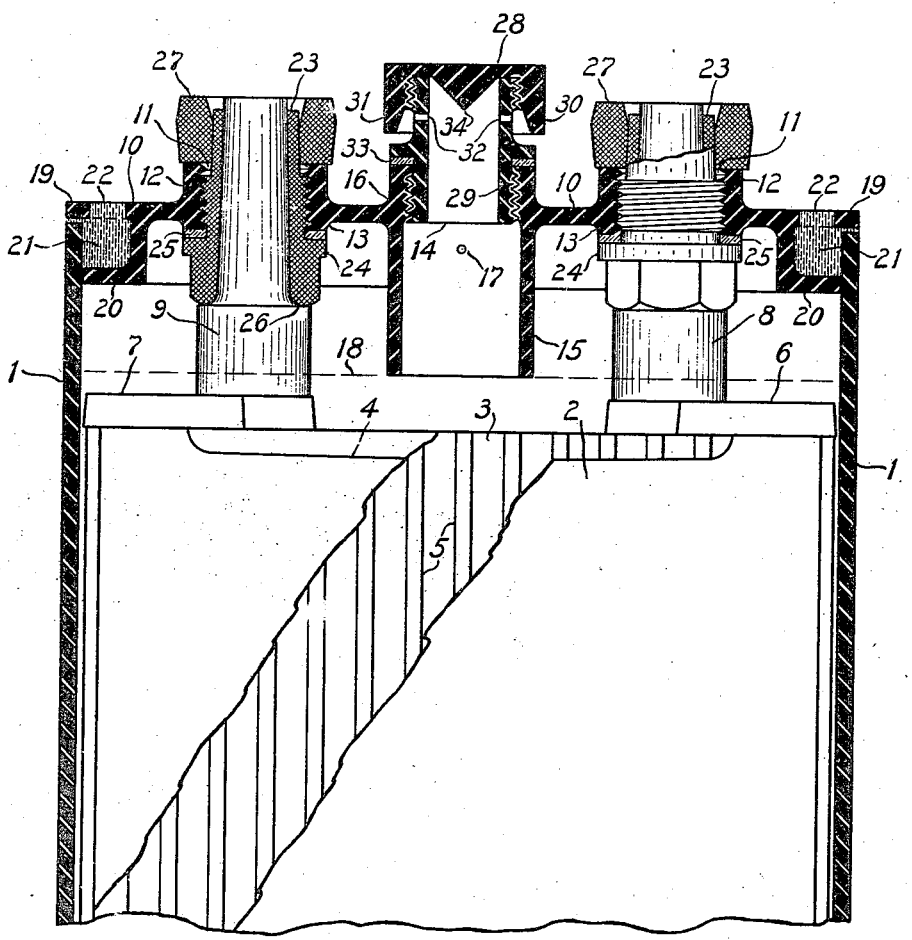
Figure 2:
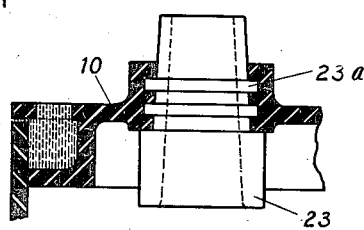

Referring to the drawings—Figure 1 represents a cross-sectional view of a battery cell according to the present invention. Fig. 2 represents a modification.

The numeral 1 indicates the walls of a jar which may be of any suitable material as, for instance, hard rubber. Located within said jar are the usual battery plates and separators. One of said plates is indicated by the numeral 2. Said plate 2 is shown broken away to show a separator 3, which is also shown broken away to disclose a plate 4 of polarity opposite to plate 2. Separator 3 is shown as provided with the usual ribs 5. Plates 2, of like polarity, are united by a strap 6 joined thereto in the usual way. Plates 4 are also united by a strap 7. If desired, straps 6 and 7 may rest upon the tops of the separators, serving to hold said separators against movement. Integrally formed with the straps 6 and 7 are the posts 8 and 9. Straps 6 and 7 and posts 8 and 9 may be of lead or other suitable material.

Mounted on the top of the jar 1 is a cover indicated by the numeral 10. This cover may be of any suitable material as, for instance, hard rubber. Said cover is provided with two apertures 11, surrounded by collars 12 on the upper side of the cover and bosses 13 on the lower side of the cover. Said cover is provided with an opening 14, surrounded by a collar 15 on the under side of the cover and a boss 16 on the upper side thereof. Said collar 15 is provided with apertures 17 for a purpose which will appear hereinafter. Said collar 15 should extend downwardly to the normal level of the electrolyte, which level is indicated by the broken line 18.

The cover 10 is provided with edge portions 19 coinciding in contour and dimensions with the outside of the jar 1. Depending from the cover is a flange 20 formed to provide a trough extending around the cover. This trough is adapted to hold a sealing compound 21 which may be poured into said trough through apertures 22 in the cover. The sealing compound forms an effective seal to prevent the electrolyte from leaking between the cover and the walls of the jar.

Located in the apertures 11 are bushings 23 which may be of lead or other suitable material. Said bushings 23 are externally screw threaded to engage internally screw threaded portions of the collars 12. Said bushings may be provided with collars 24 adapted to engage gaskets 25 of rubber or other suitable material. When said bushings are screwed into place with the gaskets 25 tightly compressed between the collars 24 and bosses 13, an effective seal is provided between each bushing and the cover.

The bushings 23 are adapted to receive the cell posts 8 and 9, each post being provided with a shoulder 26 to engage the lower end of one of said bushings. Resting on the tops of the collars 12 and engaging the tops of the bushings 23 are the usual links 27 connecting posts of unlike polarity of adjacent cells. In the assembling of a cell, when the cover with its bushings has been placed over the cell posts and the links 27 have been put in place, the top of each post, the top of its bushing 23 and the adjacent part of link 27 will be burnt into one integral mass, sufficient lead being added to fill up the aperture in link 27, making a smooth joint. A perfect electrical and mechanical connection is thus provided between each post and its link, which also effectually prevents the escape of any electrolyte which might otherwise creep up the posts. The posts 8 and 9, the bushings 23 and links 27 are represented on the drawing as they appear before burning, for the purpose of showing at a glance how the parts are assembled.

Screw threaded into the boss 16 is a cup-shaped cap 28 for the aperture 14. This cap 28 is shown as composed of two parts 29 and 30, screw-threaded together, the outer portion 30 being provided with a depending apron portion 31, located in front of the apertures 32 in the portion 29. A gasket 33 of any suitable material may be provided between the cap 28 and the boss 16.

In use the cap 28 will be removed for the purpose of pouring the electrolyte into the jar. When the level of the electrolyte has reached the bottom of the collar 15, it will be at the desired height. When more electrolyte is added it will suddenly fill up the space within the collar 15, constituting a sign to the attendant to discontinue the pouring. Flooding of the cell will therefore be prevented. Gases may escape through the apertures 17 and 32. The cell would have to be tilted to a degree never encountered in automobile practice, before the electrolyte could flow through opening 14 and apertures 32. If, however, due to the bubbling which may occur, some of the electrolyte is sprayed up through the collar and out of the aperture 32, it is prevented from spurting by the apron 31. Inasmuch as the collar 15 covers only a small part of the surface of the electrolyte, only a small amount of spray can reach the aperture 32. The drops condensing from this spray will fall harmlessly upon the top of the cover 10, whence they may be collected by any convenient means. The apron 31 also protects the aperture 32 from being clogged by dirt and also serves to prevent foreign substances from finding their way into the cell through said apertures 32. The under wall of the top portion of the cap 28 is of conical shape with the apex 34 centrally placed. As a consequence, any electrolyte which is sprayed upon the top of the cap will collect at the apex 34 and drop back into the cell.

Instead of screw-threading the bushings 23 into the cover 10, the construction illustrated in Fig. 2 may be used. According to this modification, the screw threads on the outside of the bushing may be replaced by collars 23ª, though the threads may be used, if preferred. In either case the cover 10 is molded around the bushings, making such intimate contact with the same as to effectually prevent the passage of electrolyte or gas.

One embodiment of the present invention has been described in detail. Many modifications will suggest themselves to those skilled in the art. It is intended that this case shall cover all such modifications that fall within the scope of the invention as defined by the appended claims.

Having described our invention, what we claim as new and desire to secure by Letters Patent of the United States, is:—

1. In combination, a battery jar, battery plates therein, said plates being provided with a cell post, a cover for said jar through which said post is adapted to extend, a bushing for said post, a link engaging said bushing, said post, bushing and link being integrally united.

2. In combination, a battery cell cover, a cell post adapted to extend through an aperture in said cover, a bushing for said post secured in said cover, said post and bushing being integrally united and a gasket located between said cover and part of said bushing to act as a seal therebetween.

3. In combination, a battery cell cover, a cell post adapted to extend through an aperture in said cover, a bushing for said post located in said aperture, a gasket located between said cover and a part of said bushing to act as a seal therebetween, and a link adjacent said bushing, said post, bushing and link being integrally united.

4. In combination, a battery cell cover, a cell post adapted to extend through an aperture in said cover, a bushing surrounding said post and located in said aperture, said cover and said bushing being tightly sealed, and said bushing and said post being integrally united.

5. In combination, a battery cell cover, a cell post adapted to extend through an aperture in said cover, a bushing surrounding said post and located in said aperture, means for sealing said cover and said bushing, said bushing and said post being integrally united.

6. A battery cell cover having an aperture therethrough for the reception of a cell post, and a lead bushing in said aperture, said bushing and cover being in such intimate contact as to prevent the passage of electrolyte therebetween.

7. A battery cell cover having an aperture therethrough for the reception of a cell post, and a lead bushing in said aperture having ridges extending around its exterior surface, said bushing and said cover being in such intimate contact that the passage of electrolyte therebetween is prevented.

8. In combination, a cell post, a bushing thereon, and a link member, all integrally united.

9. In combination, a cell post provided with a shoulder, a bushing on said post adapted to rest on said shoulder, and a link, said post, bushing and link being integrally united.

10. In combination, a cell cover, a cell post adapted to extend therethrough, and a screw-threaded lead bushing adapted to be screwed into said cover and to surround said post.

11. In combination, a cell cover, a cell post adapted to extend therethrough, a screw threaded bushing adapted to be screwed into said cover and to surround said post, and a link, said post, bushing and link being integrally united.

In witness whereof, we have hereunto subscribed our names.

CAMPBELL C. CARPENTER.
ROY J. ELLIS.